US00RE37034E

(19) United States
(12) Reissued Patent
Hotta et al.

(10) Patent Number: US RE37,034 E
(45) Date of Reissued Patent: Jan. 30, 2001

(54) REVERSIBLE THERMOSENSITIVE RECORDING MATERIAL

(75) Inventors: Yoshihiko Hotta, Mishima; Keishi Kubo, Yokohoma, both of (JP)

(73) Assignee: Ricoh Company, Ltd., Tokyo (JP)

( * ) Notice: This patent is subject to a terminal disclaimer.

(21) Appl. No.: 08/231,751

(22) Filed: Apr. 25, 1994

Related U.S. Patent Documents

Reissue of:
(64) Patent No.: 5,108,980
Issued: Apr. 28, 1992
Appl. No.: 07/627,329
Filed: Dec. 14, 1990

U.S. Applications:

(60) Division of application No. 07/321,854, filed on Mar. 10, 1989, now Pat. No. 5,017,421, which is a continuation-in-part of application No. 07/165,901, filed on Mar. 9, 1988, now abandoned.

(30) Foreign Application Priority Data

Mar. 10, 1987 (JP) ..... 62-055650
Jun. 19, 1987 (JP) ..... 62-152550

(51) Int. Cl.[7] ..... B41M 5/40
(52) U.S. Cl. ..... 503/226; 427/152; 503/200; 503/201; 503/217; 503/225

(58) Field of Search ..... 427/152; 428/195, 428/913, 914; 503/200, 201, 217, 225, 226

(56) References Cited

U.S. PATENT DOCUMENTS

| | | | |
|---|---|---|---|
| 4,917,948 | 4/1990 | Hotta | 428/335 |
| 5,017,421 | 5/1991 | Hotta et al. | 428/216 |
| 5,085,934 | 2/1992 | Hotta et al. | 428/335 |
| 5,087,601 | 2/1992 | Hotta et al. | 503/200 |
| 5,158,924 | 10/1992 | Konagaya et al. | 503/201 |
| 5,158,926 | 10/1992 | Hotta et al. | 503/217 |
| 5,219,820 | 6/1993 | Morohoshi et al. | 503/204 |
| 5,260,254 | 11/1993 | Hotta et al. | 503/217 |
| 5,283,220 | 2/1994 | Kawaguchi et al. | 503/200 |

FOREIGN PATENT DOCUMENTS

| | | | |
|---|---|---|---|
| 0053482 | 3/1983 | (JP) | 503/217 |
| 0257289 | 12/1985 | (JP) | 503/217 |

*Primary Examiner*—B. Hamilton Hess
(74) *Attorney, Agent, or Firm*—Oblon, Spivak, McClelland, Maier, & Neustadt, P.C.

(57) ABSTRACT

A reversible thermosensitive recording material is disclosed, which comprises (a) a support, (b) a reversible thermosensitive recording layer formed thereon which comprises as the main components a matrix resin and an organic low-molecular-weight material dispersed in the matrix resin, and has a temperature-dependent transparency, and (c) an overcoat layer comprising as the main component a resin or an ultraviolet-light-setting resin, formed on the reversible thermosensitive recording layer.

7 Claims, 1 Drawing Sheet

REVERSIBLE THERMOSENSITIVE RECORDING MATERIAL

Matter enclosed in heavy brackets [ ] appears in the original patent but forms no part of this reissue specification; matter printed in italics indicates the additions made by reissue.

This is a division of application Ser. No. 07/321,854, filed on Mar. 10, 1989, now U.S. Pat. No. 5,017,421 which is a [continuation] *continuation-in-part* of Ser. No. 07/165, 901 filed on Mar. 9, 1988, now abandoned.

The present invention relates to a reversible thermosensitive recording material capable of recording images and deleting the same reversibly by utilizing the property that its transparency changes reversibly from a transparent state to an opaque state, and vice versa, depending upon the temperature thereof.

Conventionally there are proposed reversible thermosensitive recording materials capable of performing such reversible recording and deleting images, which comprise a support and a reversible thermosensitive recording layer in which an organic low-molecular-weight material, such as a higher alcohol and a higher fatty acid, is dispersed in a resin such as polyester and polyamide, as disclosed, for example, in Japanese Laid-Open Patent Applications 54-119377 and 55-154198. In these reversible thermosensitive recording materials, the property that the transparency of the recording layer changes in accordance with the temperature thereof is utilized for forming images and deleting the same in the recording layer.

Such conventional reversible thermosensitive recording materials, however, have the shortcoming that clear images cannot always be obtained easily by a heat application means such as a thermal head which comes into contact with the surface of the recording layer. This is because the friction between the surface of the recording layer and such heat application means is so large that it is difficult to bring the heat application means into close contact with the surface of the recording layer and accordingly high thermosensitivity cannot be obtained.

Another shortcoming of the conventional reversible thermosensitive recording materials is that the image formation and deletion performance-degrades while in repeated use.

A further shortcoming of the conventional reversible thermosensitive recording materials is that when the formation and deletion of images are repeated by using a heat application means such as a thermal head, the surface of the recording materials is deformed by the heat and pressure applied by the heat application means, so that the formed images are deformed or the portions to be made transparent tends to become opaque due to the reduction in transparency of the recording materials.

SUMMARY OF THE INVENTION

It is therefore a first object of the present invention to provide an improved reversible thermosensitive recording material capable of forming clear images by improving the thermosensitivity thereof through attaining more close contact of a heat application means for recording, such as a thermal head, with the surface of the recording layer.

A second object of the present invention is to provide a reversible thermosensitive recording material having a high and stable image formation and deletion performance even when used in repetition over an extended period of time.

A third object of the present invention is to provide a reversible thermosensitive recording material whose transparency is not decreased even when used in repetition over an extended period of time.

The above objects of the present invention can be achieved by a reversible thermosensitive recording material comprising (a) a support, (b) a reversible thermosensitive recording layer formed thereon, which comprises as the main components a matrix resin and an organic low-molecular-weight material dispersed in the resin, and has a temperature-dependent transparency, and (c) an overcoat layer comprising as the main component a resin, formed on the reversible thermosensitive recording layer. In particular, the third object of the present invention is effectively attained by using an overcoat comprising as the main component an ultraviolet-light-setting resin.

DETAILED DESCRIPTION OF THE PREFERRED EMBODIMENTS

As mentioned previously, a reversible thermosensitive recording material according to the present invention comprises (a) a support, (b) a reversible thermosensitive recording layer formed thereon which comprises as the main components a matrix resin and an organic low-molecular-weight material dispersed in the resin, and has a temperature-dependent transparency, and (c) an overcoat layer comprising as the main component a resin or an ultraviolet-light-setting resin, formed on the reversible thermosensitive recording layer.

Figure 1:
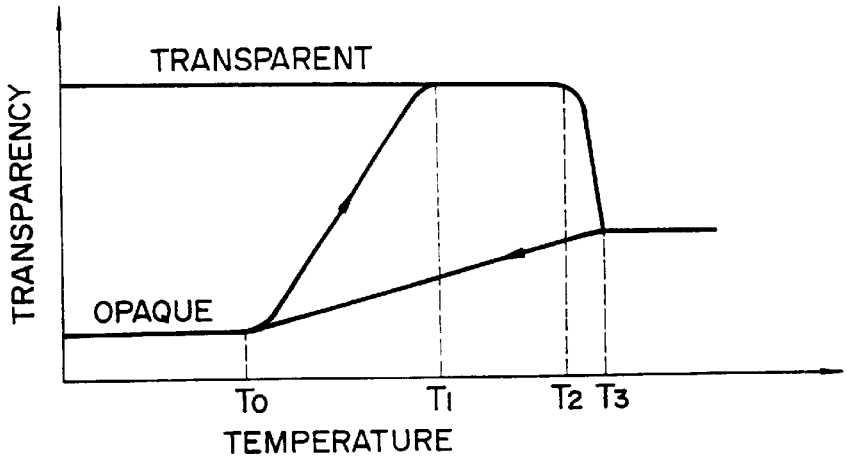
FIG. 1 is a diagram in explanation of the principle of the formation and deletion of images in a reversible thermosensitive recording material according to the present invention.

The principle of the formation and deletion of images in the reversible thermosensitive recording material according to the present invention will now be explained with reference to FIG. 1.

In the figure, it is supposed that the thermosensitive recording layer is initially in a milky white opaque state at room temperature $T_0$ or below and this opaque state will be referred to as a maximum opaque state. When the recording material is heated to temperature $T_1$, the recording layer becomes transparent. This transparent state is maintained even if the temperature is further heated to temperature $T_2$. Thus, the recording material reaches a maximum transparent state at the temperature $T_1$, and is in the maximum transparent state at temperatures $T_1$ through $T_2$. Even if the recording material which is already in the maximum transparent state is cooled to room temperature $T_0$ or below, the same transparent state is maintained. It is considered that this is because the organic low-molecular-weight material changes its state from a polycrystalline state to a single crystalline state via a semi-melted state during the above-mentioned heating and cooling steps.

When the recording material in the maximum transparent state is further heated to temperature $T_3$, it reaches a medium state which is between the maximum transparent state and the maximum opaque state. When the recording material in the medium state at temperature $T_3$ is cooled to room temperature $T_0$ or below, the recording material returns to the original maximum opaque state, without passing through any transparent state. It is considered that this is because the organic low-molecular-weight material is melted when heated to temperature $T_3$ or above, and the polycrystals of the organic low-molecular-weight material grow when cooled to temperature $T_0$ or below. If the recording material in the maximum opaque state is heated to any temperature between temperature $T_0$ and temperature $T_1$ and then cooled to a temperature below $T_0$, the recording material reaches an intermediate state between the transparent state and the maximum opaque state.

When the recording material in the maximum transparent state at room temperature $T_0$ is again heated to temperature $T_3$ or above, and then cooled to room temperature $T_0$, the recording material again returns to the maximum opaque state. Thus, the reversible thermosensitive recording material according to the present invention can be in a maximum milky white opaque state, a maximum transparent state, and an intermediate state between the aforementioned two states at room temperature $T_0$.

Therefore, for example, when a thermosensitive recording material comprising a support and such a reversible thermosensitive recording layer formed thereon is heated to a temperature between $T_1$ and $T_2$ to reach a transparent state and then cooled to room temperature $T_0$, while maintaining the same transparent state, and then the recording material is partially or imagewise heated to a temperature above $T_3$ by use of a heat application means such as a thermal head to make the heat applied portions milky white opaque, white images can be formed on the recording material at room temperature. When a colored sheet or board, for instance, a black paper, is placed behind the white image-bearing reversible thermosensitive recording material in close contact therewith, milky white images on a colored (for instance, black) background can be obtained.

Furthermore, when the reversible thermosensitive recording material is heated to temperature above $T_3$ and then cooled to room temperature $T_0$ or below to reach a milky white opaque state, and then the recording material is partially or imagewise heated to a temperature between $T_1$ and $T_2$ by use of a thermal head to make the heat applied portions transparent, transparent images can be formed on the milky white background at room temperature. When a colored sheet or board, for instance, a black paper, is placed behind the transparent image-bearing reversible thermosensitive recording material in close contact therewith, colored images on the milky white background can be obtained.

In the reversible thermosensitive recording material according to the present invention, the above-mentioned recording and deleting cycle can be repeated at least about 10,000 times.

The reversible thermosensitive recording material according to the present invention can be prepared by forming a reversible thermosensitive recording layer on a support and then forming an overcoat layer on the recording layer. Instead of using a support, the reversible thermosensitive recording layer can be made of a self-supporting film by a conventional film formation method so as to obtain a sheet-shaped reversible thermosensitive recording material.

FORMATION OF REVERSIBLE THERMOSENSITIVE RECORDING LAYER

A solution of a resin and an organic low-molecular-weight material which are dissolved in a solvent, or a dispersion of a resin, a solvent and an organic low-molecular-weight material, is prepared, provided that in the dispersion, the low-molecular-weight material is not dissolved in the solvent, but dispersed therein in the form of finely-divided particles. Either the solution or the dispersion is coated on a support such as a plastic film, a glass plate or a metal plate, to form a reversible thermosensitive recording layer thereon.

As the solvent for use in the solution or dispersion for forming the reversible thermosensitive recording layer, a variety of solvents can be employed, depending upon the kind of the organic low-molecular-weight material and the resin serving as the matrix resin employed. Specific examples of the solvent are tetrahydrofuran, methyl ethyl ketone, methyl isobutyl ketone, chloroform, carbon tetrachloride, ethanol, toluene and benzene.

In the thus prepared thermosensitive recording layer, the organic low-molecular-weight material is uniformly dispersed in the resin in the form of finely-divided particles. The resin for use in the thermosensitive recording layer not only supports the uniformly dispersed organic low-molecular-weight material therein, so as to form the recording layer in the form of a film or a sheet, but also provides the recording layer with the property of being transparent at the maximum transparency. For this purpose, it is preferable that the resin for use in the thermosensitive recording layer have high transparency, high, mechanical stability and strength, and high film-formation property.

Specific examples of the matrix resin for use in the thermosensitive recording layer are polyvinyl chloride; vinyl chloride copolymers such as vinyl chloride-vinyl acetate copolymer, vinyl chloride-vinyl acetate-vinyl alcohol copolymer, vinyl chloride-vinyl acetate-maleic acid copolymer, and vinyl chloride-acrylate copolymer; vinylidene-chloride copolymer such as vinylidene chloride-acrylonitrile; polyester; polyamide; polyacrylate, polymethacrylate, acrylate-methacrylate copolymer, and silicone resin. These resins may be used alone or in combination.

The organic low-molecular-weight material can be selected in accordance with the desired temperature range of $T_0$ through $T_3$. It is generally preferable that the organic low-molecular-weight materials for use in the present invention have melting points of 30° C. to 200° C., more preferably about 50° C. to about 150° C. Specific examples of such organic low-molecular-weight materials are alkanol; alkanediol; halogenated alkanol, and halogenated alkanediol; alkylamine; alkane; alkene; alkyne; halogenated alkane; halogenated alkene; halogenated alkyne; cycloalkane; cycloalkene; cycloakyne; saturated and unsaturated monocarboxylic and dicarboxylic acids, esters, amides and ammonium salts thereof; saturated and unsaturated halogenated aliphatic acids, esters, amides and ammonium salts thereof; allylcarboxylic acids, esters, amides and ammonium salts thereof; halogenated allylcarboxylic acids, esters, amides and ammonium salts thereof; thioalcohol; thiocarboxylic acids, esters, amides and ammonium salts thereof; and carboxylic acid esters of thioalcohol. These can be employed alone or in combination.

It is preferable that the above compounds have 10 to 60 carbon atoms, more preferably 10 to 38 carbon atoms, more preferably 20 to 30 carbon atoms. The alcohol group moieties in the above esters may be saturated or unsaturated or halogenated. Further it is preferable that the organic low-molecular-weight materials contain in the molecule thereof at least one element selected from the group consisting of oxygen, nitrogen, sulfur and halogen. More specifically, it is preferable that the organic low-molecular-weight materials contain in the molecule thereof at least one moiety selected from the group consisting of —OH, —COOH, —CONH, —COOR, —NH—, —$NH_2$, —S—, —S—S—, —O—, and halogen.

Specific examples of such organic low-molecular-weight materials are higher fatty acids such as lauric acid, dodecanoic acid, myristic acid, pentadecanoic acid, palmitic acid, stearic acid, behenic acid, nonadecanoic acid, arachic acid, and oleic acid; higher fatty acid esters such as methyl stearate, tetradecyl stearate, octadecyl stearate, octadecyl laurate, tetradecyl palmitate, and docosyl behenate; and the following ethers, thioethers and amine derivatives:

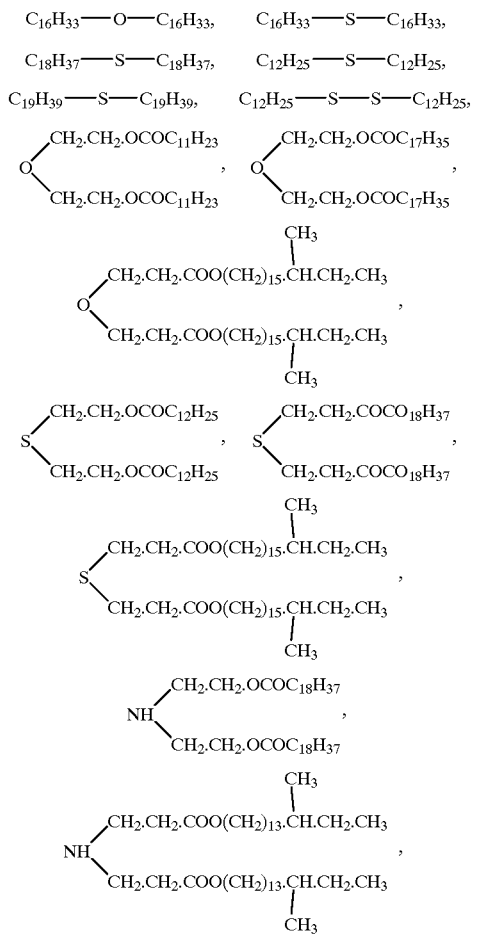

It is preferable that the weight ratio of the organic low-molecular-weight material to the resin in the reversible thermosensitive recording layer be approximately in the range of (1:0.5) to (1:16) for use in practice.

It is preferable that the reversible thermosensitive recording layer have a thickness in the range of about 1 $\mu$m to about 30 $\mu$m.

Further, in the present invention, materials by which the crystallization of the organic low-molecular-weight materials can be controlled may also be used in combination with the organic low-molecular-weight materials. Such materials are eutectic materials with the low-molecular-weight materials and capable of extending the temperature range in which the low-molecular-weight materials are in a semi-melted state. For this purpose, materials which are generally used as surface active agents are employed. Specific examples of such surface active agents for use in the present invention are polyhydric alcohol-higher fatty acid ester; polyhydric alcohol-higher alkyl ether; lower olefin oxide adducts of polyhydric alcohol-higher fatty acid ester, higher alcohol, higher alkylphenol, higher fatty acid, higher alkyl amine, higher fatty acid amide, fats, oils and polypropylene glycol; acetylene glycol; sodium, calcium, barium and magnesium salts of higher alkylbenzene-sulfonic acid; calcium, barium and magnesium salts of higher fatty acid, aromatic carboxylic acid, higher aliphatic sulfonic acid, aromatic sulfonic acid, sulfuric monoester, phoshporic mono- and di-esters; low-degree sulfonated oil; poly long-chain-alkyl acrylate; acrylic oligomer; poly long-chain alkylmethacrylate; long-chain-alkyl methacrylate-amine-contained monomer copolymer; styrene-maleic anhydride copolymer; and olefin-maleic anhydride copolymer. Plasticizers which are generally used in films can also be employed for the above-mentioned purpose. Specific examples of such plasticizers are tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl cebacate, di-2-ethylhexyl cebacate, diethylene glycol dibenzoate, triethylene glycol-2-ethyl butylate, methyl acetrylricinoleate, butyl acetylricinoleate, butylphthalyl butylglycolate, and tributyl acetylcitrate.

For controlling the growing of the crystals of the organic low-molecular-weight materials, one organic low-molecular weight material may be combined with another organic low-molecular-weight material by which the growth of the crystals of the former organic low-molecular-weight material is controlled. For example, stearic acid and stearyl alcohol may be used in combination so as to control the cyrstallization of the former material by the latter material.

In the present invention, it is preferable that the ratio by weight of the amount of the organic low-molecular-weight material to the amount of the materials for controlling the growth of the crystals of the organic low-molecular-weight material be approximately in the range of (1:0.01) to (1:0.8).

FORMATION OF OVERCOAT LAYER

An overcoat layer coating liquid which may be a solution or dispersion of a resin is coated on the above formed reversible thermosensitive recording layer, whereby an overcoat layer is formed on the recording layer. To the resin solution or dispersion, a hardening agent, a hardening promoting agent or catalyst may be added.

As the solvent for use in the preparation of the overcoat layer coating liquid, aliphatic alcohols such as ethyl alcohol and aromatic solvents such as toluene are preferable for use in the present invention.

It is preferable that the overcoat layer have such a thickness that corresponds to the size of one molecule, for example, about 3 $\mu$m, in view of the necessary coefficient of the friction for obtaining good thermosensitivity of the recording material.

In the present invention, an overcoat layer containing as the main component a resin is formed on the thermosensitive recording layer. By use of such an overcoat layer on the thermosensitive recording layer, the magnitude of the coefficient of friction of the recording layer can be significantly reduced. In particular, the reduction in the coefficient of friction of the recording material is remarkably effective when image formation is performed by application of heat through a thermal line head. This is because when image formation is performed by use of a thermal line head, the recording material is held between the line head and a platen roller and is moved together with the platen roller in pressure contact with the line head, so that the recording material is moved relative to the line head and images are formed line by line In the reversible thermosensitive recording material according to the present invention, the coefficient of friction of the recording layer is so small that the movement of the recording material is smooth even in pressure contact with the line head and there is no gap between the recording material and the line head to allow the air to enter the gap. In other words, the contact of the line head with the surface of the recording layer is very close. The result is that the heat transfer from the thermal head to the recording material is performed most effectively and accordingly high thermosensitivity can be attained in the present invention.

Specific resins for use in the overcoat layer for use in the present invention are silicon-based rubber; silicone resin; vinyl chloride copolymers such as polyvinyl chloride, vinyl chloride-vinyl acetate copolymer, vinyl chloride-vinyl acetate-vinyl alcohol copolymer, and vinyl chloride-vinyl acetate-maleic acid copolymer; vinylidene chloride copolymers such as polyvinylidene chloride, vinylidene chloride-vinyl chloride copolymer, and vinylidene chloride-acrylonitrile copolymer; polyester; polyamide; polyacrylate, polymethacrylate, and acrylate-methacrylate copolymer; polyethylene, polypropylene, polystyrene; ABS resin, polyvinyl alcohol, epoxy resin and phenol resin.

In addition to the above resins, a polysiloxane graft polymer is preferable for use in the overcoat layer.

The polysiloxane graft polymer comprises polysiloxane as the main backbone chain, to which another polymer is attached, and therefore has the overlapping properties of both polysiloxane and the attached polymer. As the polysiloxane serving as the main backbone chain, all of the conventional polysiloxanes can be employed. More specifically, of such polysiloxanes, methyl vinyl polysiloxane in which most of the organic groups are replaced by methyl groups, and a relatively small number of vinyl groups is contained in general use. Part of the methyl groups can be replaced by hydrogen atom, phenyl group, and allyl group.

On the other hand, as the polymer attached to the main backbone chain, the polymers of the following monomers can be employed: acrylic acid esters such as butyl acrylate, and 2-ethylhexyl acrylate; methacrylic acid esters such as methyl methacrylate and butyl methacrylate; vinyl esters such as vinyl acetate and vinyl propionate; aromatic vinyl compounds such as styrene and vinyl toluene; unsaturated nitriles such as acrylonitrile and methacrylonitrile; unsaturated amides such as acrylamide and N-methylol-crylamide; $\alpha$-olefins such as ethylene, propylene and isobutylene; vinyl ethers such as methyl vinyl ether, ethyl vinyl ether, and t-butyl vinyl ether; halogen-containing $\alpha,\beta$-unsaturated monomers such as vinyl chloride, vinylidene chloride, vinyl fluoride, and vinylidene fluoride; fluorine-containing methacrylic and acrylic acid esters such as trifluoroethyl methacrylate and acrylate, 2,2,3,3-tetrafluoropropyl acrylate, 1H,1H,2H,2H,2H-heptadecafluorodecyl acrylate, and 1H,1H,5H-octafluoropentyl acrylate; and polymers of aromatic fluorine-containing methacrylates and acrylates, such as 2,3,5,6-tetra-fluorophenyl acrylate, and 2,3,4,5,6-pentafluorophenyl methacrylate.

By changing the mixing ratio of the polysiloxane to any of the above polymers, the close adhesiveness of the overcoat layer with the layer under the overcoat layer can be improved, while maintaining the smoothness of the surface of the overcoat layer.

Of the above mentioned resins, silicone-based rubber and silicone resin are particularly preferable for use in the overcoat layer for better contact of a thermal head with the overcoat layer.

The polysiloxane graft polymer is particularly preferable for maintaining the image formation and deletion performance in repeated use over an extended period of time.

The silicone-based rubber is prepared by curing a highly polymerized organopolysiloxane so as to form methylene cross links between the organopolysiloxane molecules and hardening the same. As such an organopolysiloxane, a methyl vinyl polysiloxane in which most of organic groups thereof are methyl groups, and which contains a small number of vinyl groups, is preferable for use in the above. Part of the methyl groups may be replaced by hydrogen atom, phenyl group or allyl group. For the curing and hardening of the organopolysiloxane, heat application and radiation using ultraviolet light may be employed. As a matter of course, setting agents and inorganic fillers may also added to the organopolysiloxane at the time of the curing and hardening thereof.

The silicone resin for use in the overcoat layer is an organopolysiloxane having a three-dimensional network structure. The organic groups contained therein are methyl group. The methyl group may be replaced by other alkyl group and aryl group.

When an overcoat layer comprising the previously mentioned ultraviolet-light-setting resin is prepared, a liquid oligomer, prepolymer or monomer for preparing an ultraviolet-light-setting resin is coated on the thermosensitive recording layer, or a solution of an ultraviolet resin dissolved in a solvent is coated on the thermosensitive recording layer, with application of heat thereto when necessary, and the coated overcoat layer is then radiated with ultraviolet light for setting the ultraviolet-light-setting resin.

It is preferable that the overcoat layer comprising the ultraviolet-light-setting resin have a thickness ranging from 2 $\mu$m to 15 $\mu$m, more preferably from about 3 $\mu$m to about 10 $\mu$m in view of the efficient ultraviolet-light setting of the overcoat layer in the course of the formation of the overcoat layer and the thermal sensitivity to the reversible thermosensitive recording layer.

Thus, when ultraviolet-light-setting resins are employed as the resin for use in the overcoat layer, there can be obtained a reversible thermosensitive recording material whose transparency is not decreased even when used in repetition over an extended period of time. This is because ultraviolet-light-setting resins, when hardened by radiation of ultraviolet light, have not only higher heat resistance, but also higher mechanical strength than other resins, thereby the deformation of the surface of the recording material can be minimized. In other words, the deformation of the surface of the recording material is effectively minimized by these two properties.

As the ultraviolet-light-setting resins for use in the overcoat layer, any of monomers, oligomers and prepolymers which are polymerized to be set or cured by radiation of ultraviolet light can be employed. Examples of such monomers and oligomers are monomers and oligomers of ester acrylate, urethane acrylate, epoxy acrylate, butadiene acrylate, silicone acrylate, and melamine acrylate.

The above ester acrylate can be prepared by allowing a polyhydric alcohol such as 1,6-hexanediol, propylene glycol as propylene oxide), and diethylene glycol to react with (i)

a polybasic acid such as adipic acid, phthalic anhydride and trimetallitic acid, and (ii) acrylic acid.

Specific examples of the ester acrylate are as follows:

(1) adipic acid/1,6-hexanediol/acrylic acid $CH_2{=}CHCOO{-}CH_2(_5[O{-}CO{-}(CH_2)_4COO{-}CH_2)_5]_nOCOCH{=}CH_2$ wherein n=1~15.

(2) phthalic anhdydride/propylene oxide/acrylic acid

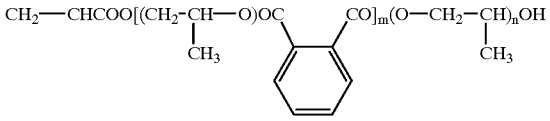

wherein l, m, n=1~10.

(3) trimettitic acid/diethylene glycol/acrylic acid

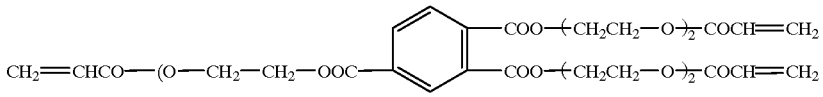

The urethane acrylate can be prepared by allowing a compound having an isocyanate group such as tolylene-diisocyanate (TDI) to react with an acrylate having hydroxyl groups.

A specific example of such an urethane acrylate is as follows:

HEA/TDI/HDO/ADA/HDO/TDI/HEA

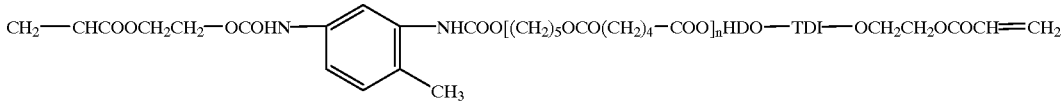

wherein n=1~10.

In the above, HEA represents 2-hydroxyethyl acrylate; HDO, 1,6-hexanediol, and ADA, adipic acid.

The epoxy acrylate is prepared by esterifying the epoxy groups of epoxy resin by acrylic acid to convert the functional groups to acryloyl groups. The epoxy acrylate can be classified in view of the chemical structure thereof into a Bisphenol A type, a novolak type, and an alicyclic type.

Specific examples of the epoxy acrylate are as follows:

(1) Bisphenol A - epichlorohydrin type/acrylic acid

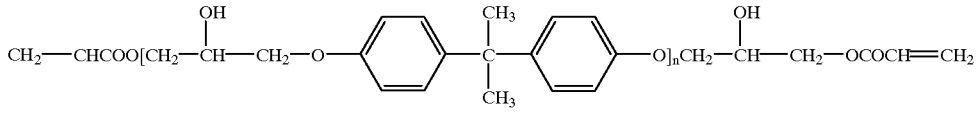

wherein n=1~15.

(2) Phenol novolak - epichlorohydrin type/acrylic acid

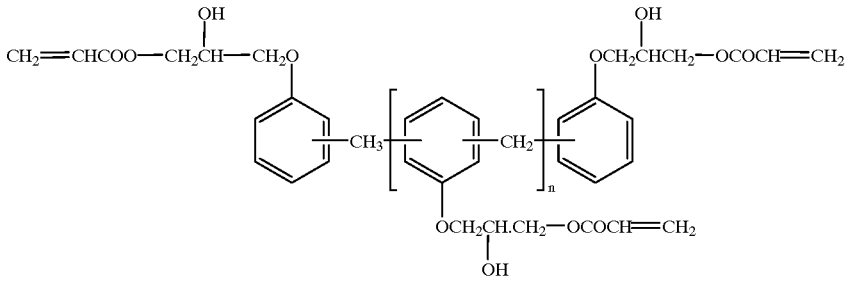

wherein n=1–5.

(3) Alicyclic type/acrylic acid

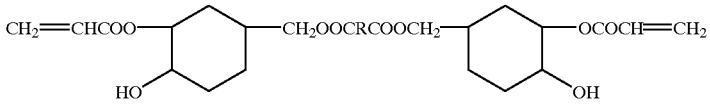

wherein R is an alkylene group having 1 to 10 carbon atoms, preferably 4 to 6 carbon atoms.

The polybutadiene acrylate can be prepared by allowing 1,2-polybutadiene having hydroxyl groups at the terminals thereof to react with, for example, isocyanate or 2-mercaptoethanol.

A specific example of the polybutadiene acrylate is as follows:

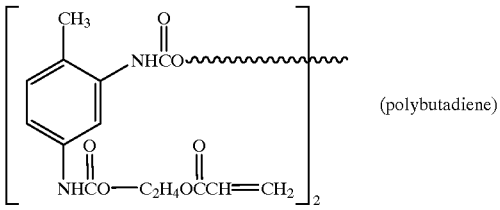

(polybutadiene)

The silicone acrylate is a methacryl-modified acrylate which is prepared by a condensation reaction (demethanolization reaction) between an organic polyfunctional trimethoxysilane and a polysiloxane having silanol groups.

A specific example of the silicone acrylate is as follows:

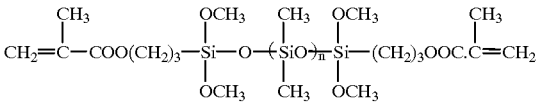

*n*: 10~14

For preparation of the overcoat layer comprising any of the ultraviolet-light-setting resins, photopolymerization initiators, which also serve as a reactive diluting agent for the preparation of the overcoat layer, may be employed.

Examples of such photopolymerization initiators are 2-ethyl-hexyl acrylate, cyclohexyl acrylate, butoxyethyl acrylate, neopentyl glycol diacrylate, 1,6-hexanediol diacrylate, polyethylene glycol diacrylate, trimethylolpropane triacrylate, and pentaerythritol acrylate.

In the present invention, an intermediate layer comprising as the main component a resin may also interposed between the reversible thermosensitive layer and the overcoat layer in order to protect the thermosensitive layer. For the formation of the intermediate layer, a conventional liquid coating method may be employed.

As the resin for use in the intermediate layer, in addition to the matrix resins for use in the reversible thermosensitive recording layer, varieties of thermoplastic resins and thermo-setting resin may be employed. For example, the following resins may be employed: polyethylene, polypropylene, polystyrene, polyvinyl alcohol, polyvinyl butyral, polyurethane, saturated polyester resin, unsaturated polyester resin, epoxy resin, phenolic resin, polycarbonate, and polyamide.

The present invention will now be explained in detail with reference to the following examples and comparative examples. These examples are given for illustration of the present invention and are not intended to be limiting thereof.

EXAMPLE 1—1

FORMATION OF REVERSIBLE THERMOSENSITIVE RECORDING LAYER

A mixture of the following components was dispersed, so that a reversible thermosensitive recording layer coating liquid was prepared.

| | Parts by Weight |
|---|---|
| Behenic acid | 4 |
| Stearyl stearate | 1 |
| Vinyl chloride - vinyl acetate copolymer (Trademark "VYHH" made by UCC Co., Ltd.) | 13 |
| Tetrahydrofuran | 92 |

The above prepared reversible thermosensitive recording layer coating liquid was coated on a 75 μm thick polyester film by a wire bar and dried with application of heat thereto, whereby a reversible thermosensitive recording layer having a thickness of 15 μm was formed on the polyester film.

FORMATION OF OVERCOAT LAYER

A mixture of the following components was completely dissolved, so that an overcoat layer coating liquid was prepared:

| | Parts by Weight |
|---|---|
| Organopolysiloxane (Trademark "SD 7226" made by Toray Silicone Co., Ltd.) | 10 |
| Catalyst (Trademark "SRX212" made by Toray Silicone Co., Ltd.) | 0.1 |
| Toluene | 49.9 |

The above prepared overcoat layer coating liquid was coated on the reversible thermosensitive recording layer by a wire bar and dried with application of heat thereto, so that a 0.5 μm thick overcoat layer made of a silicone-based rubber was formed on the reversible thermosensitive recording layer. Thus, a reversible thermosensitive recording material No. 1—1 according to the present invention was prepared.

EXAMPLE 1-2

The same reversible thermosensitive recording layer as that prepared in Example 1-1 was formed on a 75 μm thick polyester film in the same manner as in Example 1—1.

FORMATION OF OVERCOAT LAYER

A mixture of the following components was completely dissolved, so that an overcoat layer coating liquid was prepared:

| | Parts by Weight |
|---|---|
| Organopolysiloxane (Trademark "KS 779H" made by Shin-Etsu Silicone Co., Ltd.) | 10 |
| Catalyst (Trademark "PL-8" made by Shin-Etsu Silicone Co., Ltd.) | 0.1 |
| Toluene | 189.9 |

The above prepared overcoat layer coating liquid was coated on the reversible thermosensitive recording layer by a wire bar and dried with application of heat thereto, so that a 0.1 μm thick overcoat layer made of a silicone-based rubber was formed on the reversible thermosensitive recording layer. Thus, a reversible thermosensitive recording material No. 1-2 according to the present invention was prepared.

EXAMPLE 1-3

The same reversible thermosensitive recording layer as that prepared in Example 1—1 was formed on a 75 μm thick polyester film in the same manner as in Example 1—1.

FORMATION OF OVERCOAT LAYER

A mixture of the following components was completely dissolved, so that an overcoat layer coating liquid was prepared:

| | Parts by Weight |
|---|---|
| Silicone resin (Trademark "SR 2411" made by Toray Silicone Co., Ltd.) | 10 |
| Toluene | 10 |

The above prepared overcoat layer coating liquid was coated on the reversible thermosensitive recording layer by a wire bar and dried with application of heat thereto, so that a 2 μm thick overcoat layer was formed on the reversible thermosensitive recording layer. Thus, a reversible thermosensitive recording material No. 1-3 according to the present invention was prepared.

COMPARATIVE EXAMPLE 1—1

Example 1—1 was repeated except that the overcoat layer formed in Example 1—1 was eliminated, whereby a comparative reversible thermosensitive recording material No. 1—1 was prepared.

Each of the thus prepared reversible thermosensitive recording materials No. 1—1 to No. 1-3 according to the present invention and the comparative reversible thermosensitive recording material No. 1—1 was brought to a completely opaque state. Starting from this opaque state, each reversible thermosensitive recording material was heated to 65° C. to reach a transparent state. Thereafter, white images were formed in each of the recording materials by use of a 6 dots/mm thin-film type thermal head, with variation of a pulse width with application of a recording energy of 0.3 W.

Figure 2:
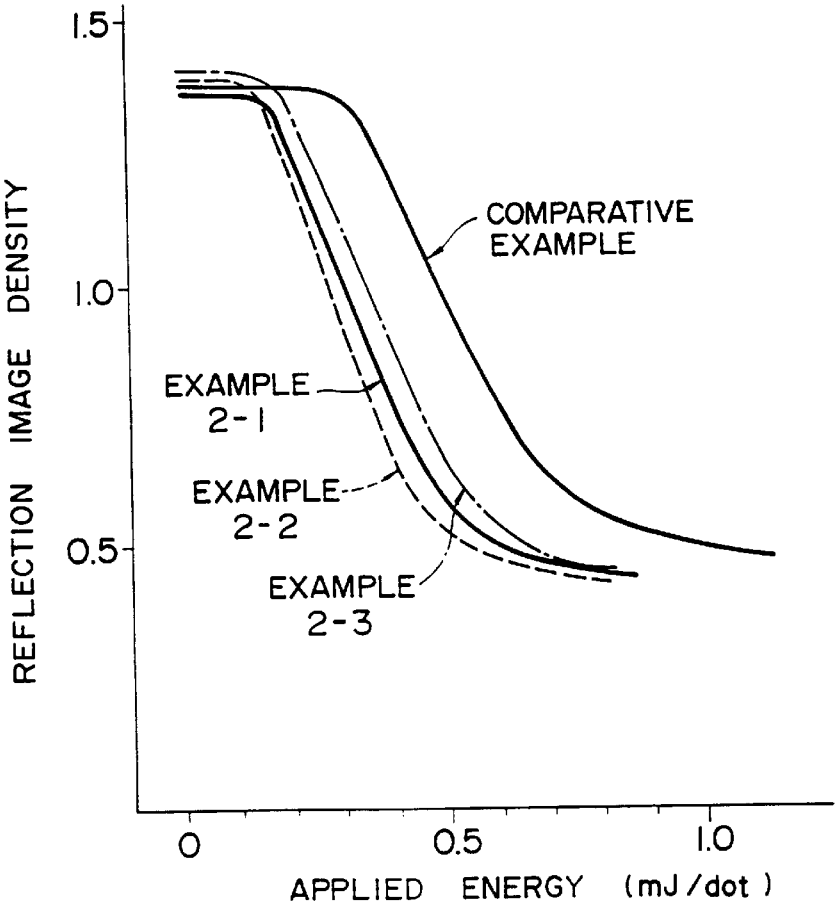
FIG. 2 is a graph showing the relationship between the applied thermal energy and the obtained image density of examples of a reversible thermosensitive recording material according to the present invention and a comparative example.

Each white-image-bearing reversible thermosensitive recording material was placed on a sheet of black paper and the reflection density of the black areas in the recording material was measured by Macbeth Densitometer RD 514. The results are shown in FIG. 2, which indicate that the recording materials provided with the overcoat layer can obtain the same reflection density with a recording energy of 20 to 40% less than the comparative recording material without the overcoat layer.

EXAMPLE 2-1

FORMATION OF REVERSIBLE THERMOSENSITIVE RECORDING LAYER

A mixture of the following components was dispersed, so that a reversible thermosensitive recording layer coating liquid was prepared:

| | Parts by Weight |
|---|---|
| Behenic acid | 4 |
| Stearyl stearate | 1 |
| Vinyl chloride - vinyl acetate copolymer (Trademark "VYHH" made by UCC Co., Ltd.) | 13 |
| Tetrahydrofuran | 92 |

The above prepared reversible thermosensitivity recording layer coating liquid was coated on a 75 μm thick polyester film by a wire bar and dried with application of heat thereto, whereby a reversible thermosensitive recording layer having a thickness of 15 μm was formed on the polyester film.

FORMATION OF OVERCOAT LAYER

A mixture of the following components was completely dissolved, so that an overcoat layer coating liquid was prepared:

| | Parts by Weight |
|---|---|
| Polysiloxane graft polymer (Trademark "R-24" made by Nippon Shokubar Kagaku Kogyo Co., Ltd.) | 5 |
| Curing agent (for the above polysiloxane graft polymer) | 0.2 |
| Dioxane | 10 |

The above prepared overcoat layer coating liquid was coated on the reversible thermosensitive recording layer by a wire bar and dried with application of heat thereto, so that a 0.5 μm thick overcoat layer made of a polysiloxane graft polymer was formed on the reversible thermosensitive recording layer. Thus, a reversible thermosensitive recording material No. 2-1 according to the present invention was prepared. This recording material was heated again to 65° C. to make it transparent.

EXAMPLE 2—2

Example 2-1 was repeated except that 1 part by weight of stearyl stearate in the formulation of the reversible thermosensitive recording layer coating liquid in Example 2-1 was replaced by 2 parts by weight of di-2-ethylhexyl adipate with the formation of a reversible thermosensitive recording layer having a thickness of 10 μm, and the thickness of the overcoat layer employed in Example 2-1 was increased to 2 μm, whereby a reversible thermosensitive recording material No. 2—2 according to the present invention was prepared. This recording material was again heated to 85° C. to make it milky white opaque.

EXAMPLE 2-3

Example 2-1 was repeated except that stearyl stearate was eliminated from the formulation of the reversible thermosensitive recording layer coating liquid in Example 2-1, whereby a reversible thermosensitive recording material No. 2-3 according to the present invention was prepared. Thus recording material was heated to 65° C. to make it transparent in the same manner as in Example 2-1.

EXAMPLE 2-4

Example 2-1 was repeated except that the polysiloxane graft polymer (Trademark "R-24" made by Nippon Shokubai Kagaku Kogyo Co., Ltd.) in the formation of the overcoat layer employed in Example 2-1 was replaced by a polysiloxane graft polymer (Trademark "R-18" made by Nippon Shokubai Kagaku Kogyo Co., Ltd.), whereby a reversible thermosensitive recording material No. 2-4 according to the present invention was prepared. This recording material was heated to 65° C. to make it transparent in the same manner as in Example 2-1.

EXAMPLE 2-5

Example 2-1 was repeated except that the overcoat layer coating liquid employed in Example 2-1 was replaced by an overcoat layer coating liquid of the following formulation, whereby a reversible thermosensitive recording material No. 2-5 according to the present invention was prepared:

FORMULATION OF OVERCOAT LAYER COATING LIQUID

| | Parts by Weight |
|---|---|
| Organopolysiloxane (Trademark "SD 7226" made by Toray Silicone Co., Ltd.) | 10 |
| Catalyst (Trademark "SRX 212" made by Toray Silicone Co., Ltd.) | 0.1 |
| Toluene | 49.9 |

COMPARATIVE EXAMPLE 2-1

Example 2-1 was repeated except that the overcoat layer formed in Example 1-1 was eliminated, whereby a comparative reversible thermosensitive recording material No. 2-1 was prepared, which is the same as the comparative reversible thermosensitive recording material No. 1—1. This comparative reversible thermosensitive recording material was heated again to 65° C. in the same manner as in Example 2-1 to make it transparent.

In the thus prepared reversible thermosensitive recording materials No. 2-1 to No. 2-5 according to the present invention and the comparative reversible thermosensitive recording material No. 2-1, images were formed by use of a 6 dots/mm thin-film type thermal head with a recording energy of 0.5 mJ/dot. More specifically, milky white images were formed on the transparent background in the recording materials No. 2-1, No. 2-3, No. 2-4, No. 2-5 and comparative recording material No. 2-1, while in the recording material No. 2-1, transparent images were formed on the milky white background.

Each of the above reversible thermosensitive recording materials was placed on a sheet of black paper and the reflection density of the image areas and non-image areas in each recording material was measured by Macbeth Densitometer RD 514. The image formation and deletion cycle was repeated 50 times and the corresponding reflection density was also measured. The results are shown in the following Table 1.

TABLE 1

| | Density in Non-image Area | Image Density in Image Area (1st) | Image Density in Image Area (50th) |
|---|---|---|---|
| Example 2-1 | 1.42 | 0.50 | 0.48 |
| Example 2-2 | 0.50 | 1.30 | 1.28 |
| Example 2-3 | 1.44 | 0.50 | 0.81 |
| Example 2-4 | 1.40 | 0.47 | 0.48 |
| Example 2-5 | 1.41 | 0.52 | 0.80 |
| Comparative Example 2-1 | 1.40 | 0.85 | 0.90 |

The above results indicate that when the overcoat layer is formed on the thermosensitive recording layer as in Examples 2-1 through 2-5, the thermal sensitivity is much better than the comparative recording material (Comparative Example 2-1). In view of the deterioration of the image quality during the repeated use, the overcoat layer made of the polysiloxane graft polymer as in Examples 2-1 through 2-4 is better than the overcoat layer made of the organopolysiloxane as in Example 2-5.

EXAMPLE 3-1

FORMATION OF REVERSIBLE THERMOSENSITIVE RECORDING LAYER

A mixture of the following components was dispersed, so that a reversible thermosensitive recording layer coating liquid was prepared:

| | Parts by Weight |
|---|---|
| Behenic acid | 8 |
| Stearyl stearate | 2 |
| Di(2-ethylhexyl)phthalate | 3 |
| Vinyl chloride - vinyl acetate copolymer (Trademark "VYHH" made by UCC Co., Ltd.) | 28 |
| Tetrahydrofuran | 200 |

The above prepared reversible thermosensitive recording layer coating liquid was coated on a 75 μm thick polyester film by a wire bar and dried with application of heat thereto, whereby a reversible thermosensitive recording layer having a thickness of 15 μm was formed on the polyester film.

FORMATION OF INTERMEDIATE LAYER

A solution of the above components was coated on the above prepared reversible thermosensitive recording layer by a wire bar and dried with application of heat thereto, whereby an intermediate layer having a thickness of 1 μm was formed on the reversible thermosensitive recording layer.

| | Parts by Weight |
|---|---|
| Polyamide resin (Trademark "CM 8000" made by Toray Industries, Inc.) | 10 |
| Methyl alcohol | 80 |

FORMATION OF OVERCOAT LAYER

A butyl acetate solution of an urethane acrylate type ultraviolet-light-setting resin (Trademark "Unidic 17-824-9" made by Dainippon Ink & Chemicals, Incorporated), serving as an overcoat layer coating liquid, was coated on the intermediate layer by a wire bar and dried with application of heat thereto, and was then subjected to ultraviolet light by an ultraviolet radiation lamp with a power of 80 W/cm for 5 seconds, whereby a 5 μm thick overcoat layer was formed on the intermediate layer. Thus, a reversible thermosensitive recording material No. 3-1 according to the present invention was prepared. This recording material was heated again to 65° C. to make it transparent.

EXAMPLE 3-2

Example 3-1 was repeated except that the urethane acrylate type ultraviolet-light-setting resin employed in the overcoat layer in Example 3-1 was replaced by an ultraviolet-light-setting resin (Trademark "FS-1052" made by Mitsubishi Rayon Co., Ltd.), whereby a reversible thermosensitive recording material No. 3-2 according to the present invention was prepared. This recording material was heated in the same manner as in Example 3-1 to make it transparent.

EXAMPLE 3—3

Example 3-1 was repeated except that the urethane acrylate type ultraviolet-light-setting resin employed in the overcoat layer in Example 3-1 was replaced by an epoxy acrylate ultraviolet-light-setting resin Trademark "Unidic C7-127" made by Dainippon Ink & Chemicals, Incorporated), and Mitsubishi Rayon Co., Ltd.), and the thickness of each of the intermediate layer and the overcoat layer was increased to 10 μm, whereby a reversible thermosensitive recording material No. 3—3 according to the present invention was prepared. This recording material was heated in the same manner as in Example 3-1 to make it transparent.

In the thus prepared reversible thermosensitive recording materials No. 3-1, No. 3-2 and No. 3—3, images were formed by use of a 6 dots/mm thin-film type thermal head with a recording energy of 0.5 mJ/dot. Each of the reversible thermosensitive recording materials was placed on a sheet of black paper and the reflection density of the non-image areas and image areas in each recording material was measured by Macbeth densitometer RD 514. The images were deleted by heating each recording material to 65° C. The above image formation and deletion cycle was repeated 50 times. The results are shown in the following Table 2.

TABLE 2

| | | Initial Density | Density at 50th Image Formation |
|---|---|---|---|
| Example 3-1 | Image Area | 0.45 | 0.43 |
| | Non-image Area | 1.42 | 1.41 |
| Example 3-2 | Image Area | 0.43 | 0.43 |
| | Non-image Area | 1.39 | 1.37 |
| Example 3-3 | Image Area | 0.50 | 0.51 |
| | Non-image Area | 1.40 | 1.39 |

The above results indicate that the transparent portions are capable of maintaining the transparency even though the image formation and deletion cycle was repeated due to the enhanced heat resistance and mechanical strength of the overcoat layer comprising the ultraviolet-light-setting resin.

What is claimed is:

1. A reversible thermosensitive recording material comprising:

(a) a support, (b) a reversible thermosensitive recording layer formed thereon which comprises as the main components a matrix resin and an organic low-molecular-weight material dispersed in said matrix resin, and has a temperature-dependent transparency, and (c) an overcoat layer comprising as the main component [an ultraviolet light-setting resin] *a resin*, formed on said reversible thermosensitive recording layer; [said ultraviolet light-setting resin] *said resin*, in said overcoat layer being selected from the group consisting of a silicone-based rubber [a silicone resin,] *and* a polysiloxane graft polymer, [polyvinyl chloride, a vinyl chloride-vinyl acetate copolymer, a vinyl chloride-vinyl acetate-vinyl alcohol copolymer, a vinyl chloride-vinyl acetate-maleic acid copolymer, polyvinylidene chloride, a vinylidene chloride-vinyl chloride copolymer, a vinylidene chloride-acrylonitrile copolymer, a polyester, a polyamide, a polyacrylate, a polymethacrylate, an acrylate-methacrylate copolymer, polyethylene, polypropylene, polystyrene, an ABS resin, polyvinyl alcohol, an epoxy resin, and a phenol resin].

[2. The reversible thermosensitive recording material as claimed in claim 1, wherein said resin in said overcoat layer is a silicone-based rubber.]

3. The reversible thermosensitive recording material as claimed in claim 1, wherein said resin in said overcoat layer is a silicone resin.

[4. The reversible thermosensitive recording material as claimed in claim 1, wherein said resin in said overcoat layer is a polysiloxane graft polymer.]

5. The reversible thermosensitive recording material as claimed in claim 1, wherein said resin in said overcoat layer is selectively from the group consisting of polyvinyl chloride, vinyl chloride-vinyl acetate copolymer, vinyl chloride-vinyl acetate-vinyl alcohol copolymer, vinyl chloride-vinyl acetate-maleic acid copolymer, polyvinylidene chloride, vinylidene chloride-vinyl chloride copolymer, vinylidene chloride-acrylonitrile copolymer, polyester, polyamide, polyacrylate, polymethacrylate, acrylate-methacrylate copolymer, polyethylene, polypropylene, polystyrene, ABS resin, polyvinyl alcohol, epoxy resin, and phenol resin.

6. The reversible thermosensitive recording material as claimed in claim 1, wherein said low-molecular-weight material is selected from the group consisting of lauric acid, dodecanoic acid, myristic acid, pentadecanoic acid, palmitic acid, stearic acid, behenic acid, nonadecanoic acid, arachic acid, oleic acid.

7. The reversible thermosensitive recording material as claimed in claim 1, wherein said low-molecular-weight material is selected from the group consisting of methyl stearate, tetradecyl stearate, octadecyl stearate, octadecyl laurate, tetradecyl palmitate, and docosyl behenate.

8. The reversible thermosensitive recording material as claimed in claim 1, wherein said matrix resin in said reversible thermosensitive recording layer is selected from the group consisting of polyvinyl chloride; vinyl chloride-vinyl acetate copolymer; vinyl chloride-vinyl acetate-vinyl alcohol copolymer, vinyl chloride-vinyl acetate-maleic acid copolymer, vinyl chloride-acrylate copolymer, vinylidene-chloride-acrylonitrile, polyester, polyamide, polyacrylate, polymethacrylate, acrylate-methacrylate copolymer, and silicone resin.

9. The reversible thermosensitive recording material as claimed in claim 1, wherein said resin in said overcoat layer is polystyrene.

* * * * *

UNITED STATES PATENT AND TRADEMARK OFFICE

CERTIFICATE OF CORRECTION

PATENT NO. : RE 37,034 P2
DATED : January 30, 2001
INVENTOR(S) : Yoshihiko Hotta et al.

It is certified that error appears in the above-identified patent and that said Letters Patent is hereby corrected as shown below:

Column 4,
Line 59, "carbon atoms, more" should read -- carbon atoms, most --.

Column 7,
Line 6, "by line In the reversible" should read -- by line. In the reversible --.

Column 9,
Line 10,

"

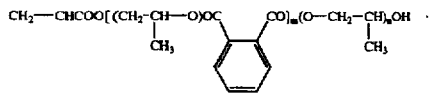

should read --

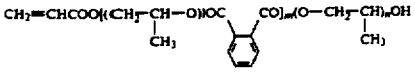

--.

Line 23, "

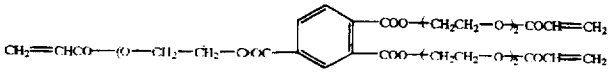

"

should read

--

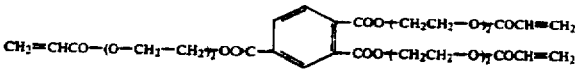

--.

Line 51, "

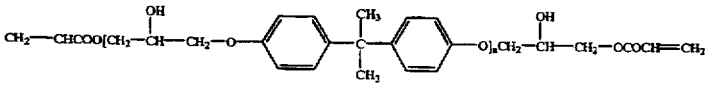

"

should read

--

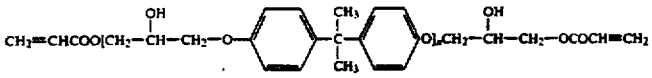

--.

UNITED STATES PATENT AND TRADEMARK OFFICE

CERTIFICATE OF CORRECTION

PATENT NO. : RE 37,034 P2
DATED : January 30, 2001
INVENTOR(S) : Yoshihiko Hotta et al.

It is certified that error appears in the above-identified patent and that said Letters Patent is hereby corrected as shown below:

Column 11,
Line 7,

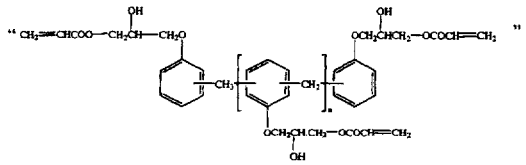

should read --

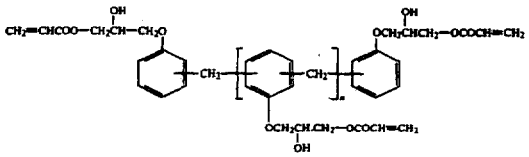

--.

Column 12,
Line 30, "thermo-setting resin" should read -- thermo-setting resins --.

Column 15,
Line 45, "was prepared. Thus" should read -- was prepared. This --.

Column 16,
Line 45, TABLE 1, in the column Image Density in Image Area (50th), Example 2-3, "0.81" should read -- 0.51 --.

Signed and Sealed this

Eighteenth Day of December, 2001

*Attest:*

*Attesting Officer*

JAMES E. ROGAN
*Director of the United States Patent and Trademark Office*